United States Patent
Hoang

(10) Patent No.: US 8,923,389 B1
(45) Date of Patent: Dec. 30, 2014

(54) UNIFIED SCALING WITH DIFFERENTIAL CODING FOR INTERNAL BIT DEPTH EXTENSION AND REFERENCE FRAME COMPRESSION

(75) Inventor: Dzung Tien Hoang, Austin, TX (US)

(73) Assignee: Zenverge, Inc., Cupertino, CA (US)

( * ) Notice: Subject to any disclaimer, the term of this patent is extended or adjusted under 35 U.S.C. 154(b) by 449 days.

(21) Appl. No.: 13/348,774

(22) Filed: Jan. 12, 2012

Related U.S. Application Data

(60) Provisional application No. 61/432,499, filed on Jan. 13, 2011, provisional application No. 61/452,035, filed on Mar. 11, 2011, provisional application No. 61/503,360, filed on Jun. 30, 2011, provisional application No. 61/504,087, filed on Jul. 1, 2011.

(51) Int. Cl.
| | | |
|---|---|---|
| H04N 7/26 | (2006.01) | |
| H04N 19/184 | (2014.01) | |
| H04N 19/102 | (2014.01) | |
| H04N 19/30 | (2014.01) | |

(52) U.S. Cl.
CPC ... H04N 19/00309 (2013.01); H04N 19/00012 (2013.01); H04N 19/00424 (2013.01)
USPC ................................ 375/240.02; 375/E7.126

(58) Field of Classification Search
None
See application file for complete search history.

(56) References Cited

U.S. PATENT DOCUMENTS

| | | | |
|---|---|---|---|
| 2009/0087111 A1* | 4/2009 | Noda et al. ................ | 382/238 |
| 2010/0020866 A1* | 1/2010 | Marpe et al. ............ | 375/240.02 |

OTHER PUBLICATIONS

Aoki, H. et al., "Performance Report of DPCM-Based Memory Compression on TE2," Joint Collaborative Team on Video Coding (JCT-VC), $2^{nd}$ Meeting, Geneva, CH, Jul. 21-28, 2010, 19 pages.
Aoki, H. et al., "Performance Report of DPCM-Based Memory Compression on TMuC 0.9," Joint Collaborative Team on Video Coding (JCT-VC), $4^{th}$ Meeting, Daegu, KR, Jan. 20-28, 2011, 13 pages.
Aoki, H. et al., "TE2: 1-D DPCM-Based Memory Compression," Joint Collaborative Team on Video Coding (JCT-VC), $3^{rd}$ Meeting, Guangzhou, CN, Oct. 7-15, 2010, 12 pages.
Aoki, H. et al., "Unbiased Clipping for IBDI," Joint Collaborative Team on Video Coding (JCT-VC), $4^{th}$ Meeting, Daegu, KR, Jan. 20-28, 2011, 3 pages.

(Continued)

*Primary Examiner* — Christopher S Kelley
*Assistant Examiner* — Kaitlin A Retallick
(74) *Attorney, Agent, or Firm* — Fenwick & West LLP

(57) ABSTRACT

A disclosed system, method and computer readable storage medium is provided to receive an input video comprising a plurality of video frames, each of which has a plurality of input pixels. Each input pixel is of n-bit depth (e.g., 8-bit depth). The method optionally increases the bitdepth of each input pixel by a predetermined factor (e.g., 4-bit factor). The method further compresses and reconstructs each pixels of the input video. The method further compresses and reconstructs each pixel of intermediate frame buffers stored in a decoder frame buffer. The method calculates an adaptive offset for each block (e.g., of size of 4×4) of reconstructed pixel values of the intermediate frame buffers. Furthermore, the method can compute two-sub-block offset values and uses them to compute an optimized adaptive offset to be applied to each pixel within the corresponding sub-block.

16 Claims, 6 Drawing Sheets

(56) References Cited

OTHER PUBLICATIONS

Budagavi, M. et al., "ALF Memory Compression and IBDI/ALF Coding Efficiency Test Results on TMuC-0.1," Joint Collaborative Team on Video Coding (JCT-VC), 2nd Meeting, Geneva, CH, Jul. 21-28, 2010, 5 pages.

Chono, K. et al., "Constrained Intra Prediction for Reducing Visual Artifacts Caused by Loss Decoder-Side Memory Compression," Joint Collaborative Team on Video Coding (JCT-VC), 4th Meeting, Daegu, KR, Jan. 20-28, 2011, 8 pages.

Chono, K. et al., "Rounding-Error Conscious Memory Compression Method for IBDI," Joint Collaborative Team on Video Coding (JCT-VC), 4th Meeting, Daegu, KR, Jan. 20-28, 2011, 6 pages.

Chujoh, T. et al., "Adaptive Scaling with Offset for Reference Pictures Memory Compression," Joint Collaborative Team on Video Coding (JCT-VC), 6th Meeting, Torino, IT, Jul. 14-22, 2011, 6 pages.

Chujoh, T. et al., "Adaptive Scaling for Bit Depth Compression on IBDI," Joint Collaborative Team on Video Coding (JCT-VC), 4th Meeting, Daegu, KR, Jan. 20-28, 2011, 8 pages.

Chujoh, T. et al., "Adaptive Scaling for Reference Pictures Memory Compression," Joint Collaborative Team on Video Coding (JCT-VC), 5th Meeting, Geneva, CH, Jan. 16-23, 2011, 6 pages.

Chujoh, T. et al., "TE2: Adaptive Scaling for Bit Depth Compression on IBDI," Joint Collaborative Team on Video Coding (JCT-VC), 3rd Meeting, Guangzhou, CN, Oct. 7-15, 2010, 5 pages.

Chujoh, T. et al., "TE2: Adaptive Scaling for Bit Depth Compression on IBDI," Joint Collaborative Team on Video Coding (JCT-VC), 2nd Meeting, Geneva, CH, Jul. 21-28, 2010, 4 pages.

Chujoh, T. et al., "Description of Video Coding Technology Proposal by Toshiba," Joint Collaborative Team on Video Coding (JCT-VC), 1st Meeting, Dresden, DE, Apr. 15-23, 2010, 40 pages.

Demircin, M.U. et al., TE2: Compressed Reference Frame Buffers (CRFB), Joint Collaborative Team on Video Coding (JCT-VC), 2nd Meeting, Geneva, CH, Jul. 21-28, 2010, 9 pages.

Hoang, D., "Unified Scaling with Adaptive Offset for Reference Frame Compression," Joint Collaborative Team on Video Coding (JCT-VC), 6th Meeting, Torino, IT, Jul. 14-22, 2011, 18 pages.

Hoang, D., "Unified Scaling with Adaptive Offset for Reference Frame Compression with IBDI," Joint Collaborative Team on Video Coding (JCT-VC), 4th Meeting, Daegu, Korea, Jan. 20-28, 2011, 12 pages.

Hoang, D., "Unified Scaling for 10-bit to 8-bit Reference Frame Compression," Joint Collaborative Team on Video Coding (JCT-VC), 5th Meeting, Geneva, CH, Mar. 16-23, 2011, 13 pages.

Lim, C. et al., "Reference Frame Compression Using Image Coder," Joint Collaborative Team on Video Coding (JCT-VC), 2nd Meeting, Geneva, CH, Jul. 21-27, 2010, 44 pages.

Liu, S. et al., "Joint Luma-Chroma Adaptive Reference Picture Memory Compression," Joint Collaborative Team on Video Coding (JCT-VC), 6th Meeting, Torino, IT, Jul. 14-22, 2011, 8 pages.

Wahadaniah, V. et al., "TE2: Reference Frame Compression Using Image Coder," Joint Collaborative Team on Video Coding (JCT-VC), 3rd Meeting, Guangzhou, CN, Oct. 7-15, 2010, 7 pages.

Zhou, M. et al., "Testing Results of TI Reference Frame Compression Algorithm Using TMuC-0.9," Joint Collaborative Team on Video Coding (JCT-VC), 4th Meeting, Daegu, Korea, Jan. 20-28, 2011, 4 pages.

Zhou, M. et al., "TE2: TI Reference Frame Compression Proposal," Joint Collaborative Team on Video Coding (JCT-VC), 3rd Meeting, Guangzhou, CN, Oct. 7-15, 2010, 4 pages.

\* cited by examiner

US 8,923,389 B1

UNIFIED SCALING WITH DIFFERENTIAL CODING FOR INTERNAL BIT DEPTH EXTENSION AND REFERENCE FRAME COMPRESSION

CROSS-REFERENCE TO RELATED APPLICATIONS

The present application claims priority under 35 U.S.C. §119(e) to U.S. Provisional Patent Application No. 61/432,499, filed on Jan. 13, 2011, U.S. Provisional Patent Application No. 61/452,035, filed on Mar. 11, 2011, U.S. Provisional Patent Application No. 61/503,360, filed on Jun. 30, 2011, and U.S. Provisional Patent Application No. 61/504,087, filed on Jul. 1, 2011, which are incorporated by reference in their entirety.

BACKGROUND

1. Field of Art

The disclosure generally relates to video compression, more particularly, to improvements in video coding efficiency using internal bit depth extension and reference frame compression.

2. Description of the Related Art

Recent video compression development indicates increasing bit depth during encoding process improves video coding efficiency. According to existing video coding experimental results (e.g., TOSHIBA's adaptive scaling scheme), by using 12 bits of internal bit depth for an 8-bit video input, over 10% of bitrate saving for some 720p ("p" stands for "progressive") and 1080p video sequences can be achieved compared to compression without increasing bit depth. The most coding gain comes from improvements in inter-frame prediction using an internal bit depth increase (IBDI) scheme.

IBDI technique refers to increasing the bit depth of pixels of a video sequence at the input to an encoder and adjusting the bit depth at the output of a decoder. IBDI can be used to improve standard elements of a block-based video codec (e.g., H.264 video coding) including arithmetic precision of prediction, transform and loop filter.

It is known that pixel bit depth has a direct impact on memory access bandwidth and capacity of the reference frame buffers used during the video encoding and decoding processes. One approach is to efficiently compress the IBDI reference frames so that the adverse impact on memory access and capacity of the frame buffers is minimized while maintaining most of the coding gain. Such an approach is referred to as reference frame compression (RFC). The existing IBDI codec faces a major challenge to balance the coding gain from bit depth increase against the adverse impact on implementation complexity. The challenges faced by the existing IBDI codec call for a system and method for improved adaptive bit depth scaling and efficient IBDI reference frame compression.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview—IBDI Compression

Figure 2:
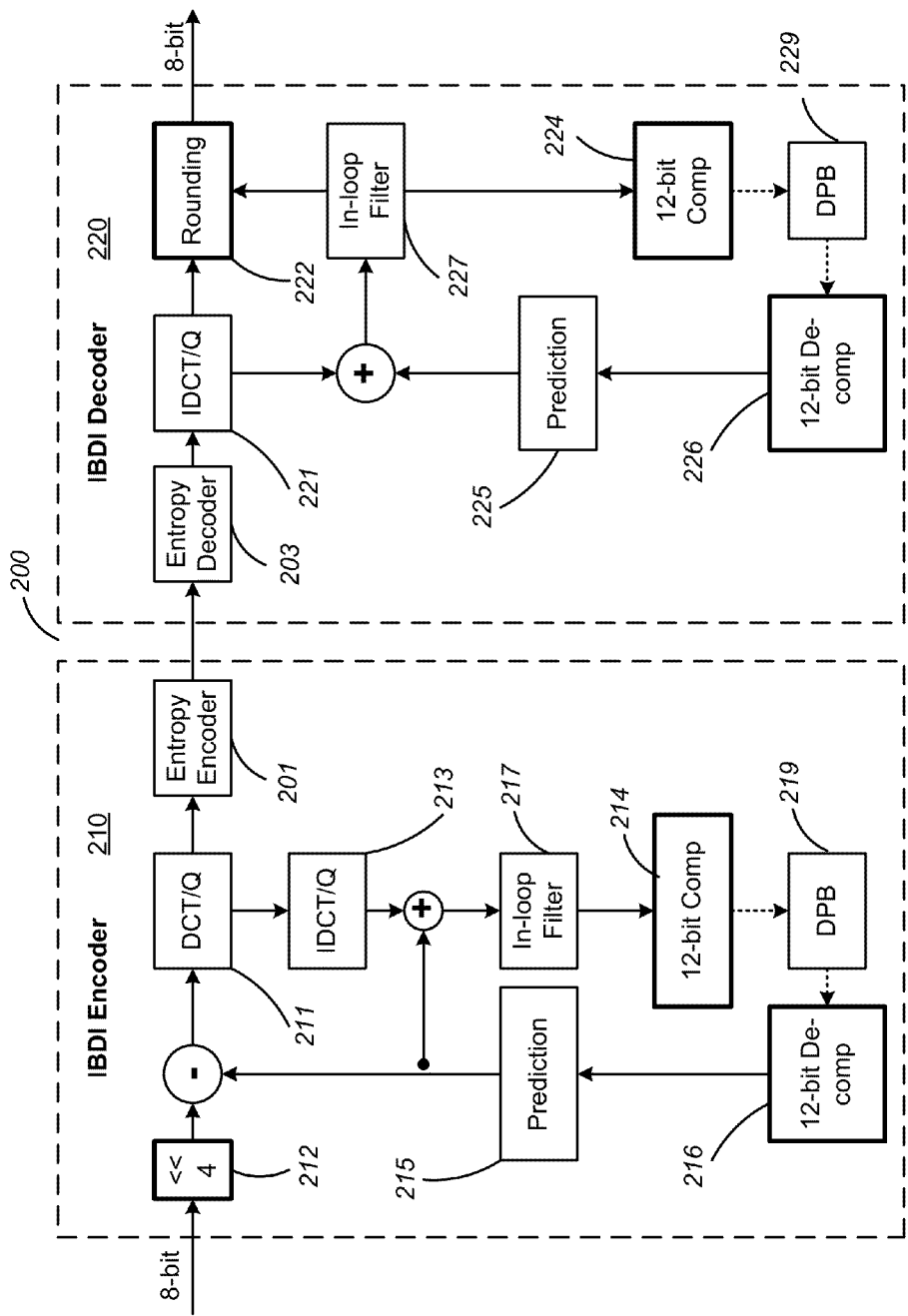
FIG. 2 illustrates an example of existing IBDI codec.

FIG. 2 shows a block diagram of an example existing IBDI codec 200. As illustrated in FIG. 2, the IBDI codec 200 comprises an IBDI encoder 210 and an IBDI decoder 220. The IBDI encoder 210 comprises a scaling module 212, a 12-bit compression module 214, a 12-bit decompression module 216 and other standard video compression modules, such as a discrete cosine transformation (DCT) module 211, a quantization module 213, a prediction module 215, an in-loop filter module 217, an entropy encoder 201 and a decoded pictures buffer (DPB) 219. Each input pixel of 8-bit depth of an input video sequence is processed by the scaling module 212, which increases the bit-depth of the input pixels. One way of increasing the bit-depth of an 8-bit pixel is by left shifting the input pixel by 4 resulting in a corresponding pixel of 12-bit depth. The 12-bit compression module 214 encodes the pixels of 12-bit depth of the input video sequence. The 12-bit decompression module 216 decodes the compressed input video of 12-bit-depth into a corresponding decompressed video sequence of 12-bit depth.

The IBDI decoder 220 comprises a rounding module 222, a 12-bit compression module 224, a 12-bit decompression module 226 and other standard video decoding modules, such as an inverse discrete cosine (IDCT)/quantization module 221, a prediction module 225, an in-loop filter module 227 and a decoded pictures buffer (DPB) 229. The IBDI decoder 220 performs similar steps as the IBDI encoder 210 in a reverse order. Specifically, the IBDI decoder 220 receives a compressed video from the IBDI encoder 210 and entropy decodes the compressed video sequence using an entropy decoder 203. The IBDI decoder 220 further inverse transforms and motion compensates the decoded frames of the video. The rounding module 222 converts the pixels of the decompressed video sequence of 12-bit depth into pixels of 8-bit depth. One way of 12-bit-to-8-bit conversion is by right shifting the 12-bit pixels by 4. The resulting output video is a decompressed video sequence of pixels of 8-bit depth.

One existing implementation of the 12-bit compression module 214 operates upon 4×4 blocks, computes the minimum pixel value (M) within a block and keeps the 8 most significant bits (MSB) of the minimum value. The maximum pixel value within the block is also recorded. The difference between the maximum pixel value and the minimum pixel value M is used to determine the amount of scaling S applied to each pixel. S is chosen so that each pixel's residual (after subtracting M from the pixel value) can be presented in pulse-code modulation (PCM) using 7 bits. If the amount of scaling is 4 (i.e., S=4), a fixed-scaling mode is used where each pixel is stored using its 8 MSB after a rounding offset is added.

The following Table 1 contains example pseudo code of the existing implementation of the 12-bit compression module 214 described above:

TABLE 1

Existing Implementation of 12-Bit Compression Module 214

```
M = (minimum pixel value in block) & ~((1<<4) – 1)
R = (maximum pixel value in block) – M
for (S=0; R>=(128<<S) && S<4; S++);
if S = 4 {
    flag =1
    P[i] = min(255, (pixel_value[i] + 8) >> 4), for all i
} else {
    flag = 0
    P[i] = (pixel_value[i] – M) >> S, for all i
}
```

The following Table 2 contains example pseudo code of the existing implementation of the 12-bit decompression module 216:

TABLE 2

Existing Implementation of 12-Bit Decompression Module 216

```
if (flag == 1) {
    D[i] = P[i] << 4, for all i
} else {
    if ( S == 0 ) {
        D[i] = P[i] + M, for all i
    } else {
        D[i] = (P[i] << S) + M + (1 << (S-1)), for all i
    }
}
```

The following Table 3 contains an example compression storage format of the existing implementation of the 12-bit compression module 214 described above:

TABLE 3

Existing Compression Storage Format

```
flag = u(1);                       /* Fixed or adaptive scaling */
if (flag) {
    /* Fixed scaling: 128-bit */
    for (i=0; i<16; i++) u(8)      /* pixel value P[i]*/
} else {
    /* Adaptive scaling: 122-bit */
    u(2);                          /* S: [0..3] */
    u(8);                          /* M>>4: [0..255] */
    for (i = 0; i<16;i++) u(7)     /* pixel value P[i]*/
}
```

As shown in the above Table 3, the existing implementation of adaptive scaling requires one bit (e.g., the "flag") to signal the fixed-scaling mode. Thus, the worst case of the scheme requires 129 bits to represent each 4×4 block, which results in a compression that is slightly higher than 8 bits per pixel on average. Additionally, when adaptive scaling mode is used, there are 5 unused bits available that can be used for furthering coding efficiency.

Configuration Overview—Improved IBDI Compression

One example embodiment of a disclosed system, method and computer readable storage medium includes receiving an input video comprising a plurality of video frames, each of which has a plurality of input pixels. Each input pixel is of n-bit depth (e.g., 8-bit depth). The method increases the bit-depth of each input pixel by a predetermined factor (e.g., 4-bit). The method further quantizes and de-quantizes each pixel of intermediate frame buffers stored in a decoder picture buffer (DPB). The method calculates an adaptive offset for each block (e.g., of size 4×4) of de-quantized pixel values of the intermediate frame buffers and applies the adaptive offset to each block of de-quantized pixel values of the intermediate frame buffers. Furthermore, the method can compute two sub-block offset values and uses the two sub-block offset values to compute an optimized adaptive offset to be applied to each pixel within the corresponding sub-block.

To improve the coding efficiency of compression with IBDI, one embodiment includes a method that efficiently codes residual pixel values of the input video. The method computes the residual pixel values as the scaled difference between the original pixel value of an input pixel and a quantized minimum value. The method scans the residual pixel values using a cyclic scanning pattern and applies delta coding to the residual pixel values based upon a selected scaling factor.

Computing Machine Architecture

Figure 1:
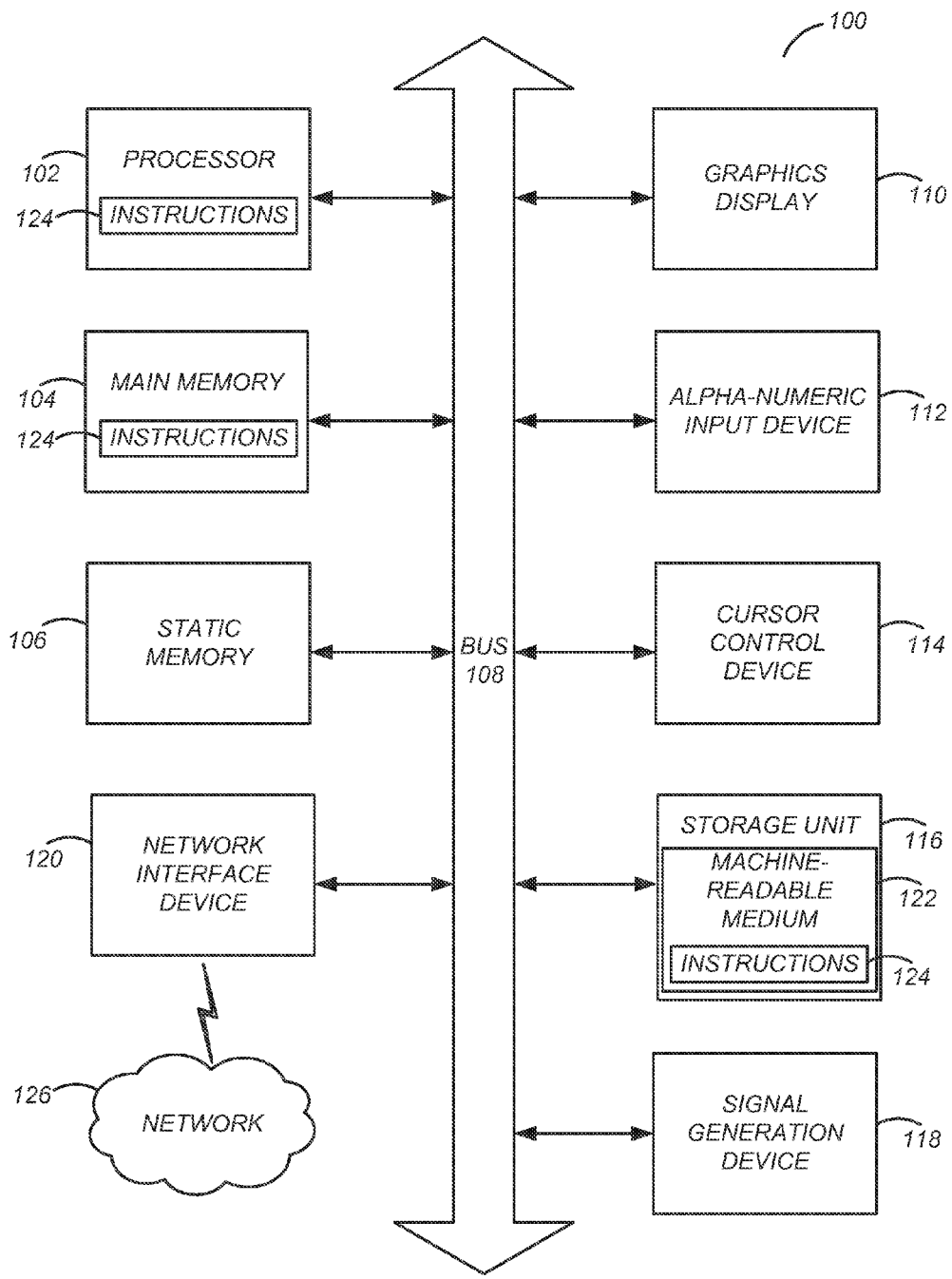
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 (e.g., non-transitory computer-readable storage medium) on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architectural Overview

Figure 3:
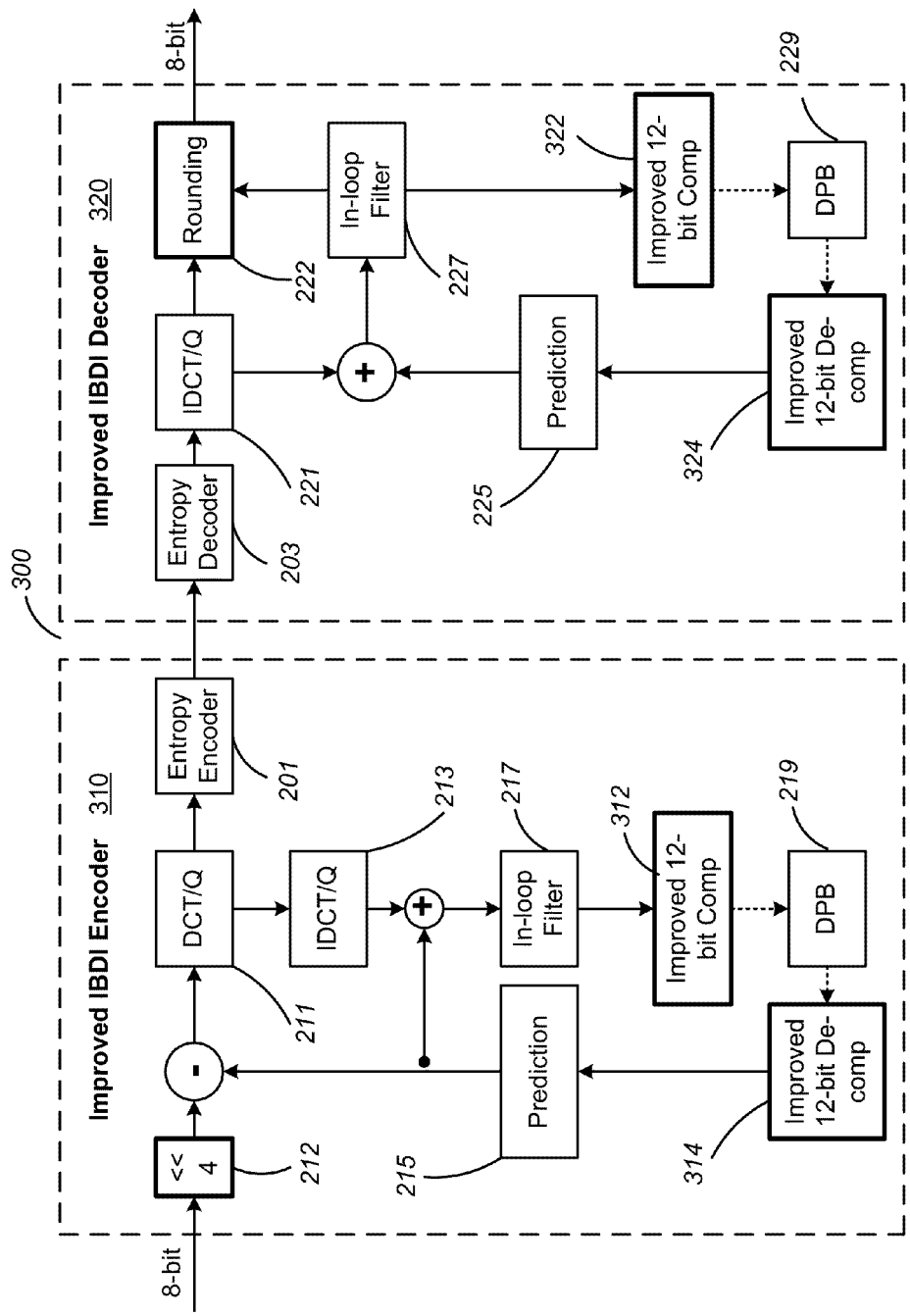
FIG. 3 is an IBDI codec with improved video coding efficiency according to one embodiment.

FIG. 3 illustrates a system architectural overview of an embodiment of an improved IBDI codec 300. The IBDI codec 300 comprises an improved IBDI encoder 310 and an improved IBDI decoder 320. The improved IBDI encoder 310 receives 8-bit pixels of an input video and converts the 8-bit pixels into 12-bit pixels. In the embodiment illustrated in FIG. 3, the improved IBDI encoder 310 left shifts each 8-bit pixel of the input video. Other embodiments may increase the bit depth using other schemes. The improved IBDI encoder 310 transforms and inverse transforms the input video. The improved IBDI encoder 310 further applies an in-loop filter to filter out noise from the transformation and inter frame prediction. The improved IBDI encoder 310 compresses the 12-bit pixels of the input video and stores the compressed video frames of the input video in a video frame buffer (DPB). The improved IBDI encoder 310 accesses the frame buffer and selects one or more reference frames for decompression. The improved IBDI encoder 310 uses the decompressed references frames for inter frame prediction. The improved IBDI encoder 310 entropy encodes the transformed and predicted video frames of the input video by an entropy encoder. The improved IBDI encoder 310 comprises an improved 12-bit compression module 312 for compressing 12-bit pixels of the input video and an improved 12-bit decompression module 314 for decompressing a compressed frame.

The improved IBDI decoder 320 performs similar steps as the improved IBDI encoder 310 in a reverse order. Specifically, the improved IBDI decoder 320 receives a compressed video from the improved IBDI encoder 320 and entropy decodes the compressed video sequence using an entropy decoder 203. The decoder 310 further inverse transforms and motion compensates the decoded frames of the video. The improved decoder 320 comprises an improved 12-bit compression module 322 for compressing 12-bit pixels of the video, an improved 12-bit decompression module 324 for decompressing a compressed frame and other standard video decoding modules, such as an inverse discrete cosine (IDCT)/quantization module 221, a prediction module 225, an in-loop filter module 227 and a decoded pictures buffer (DPB) 229. In one embodiment, the improved 12-bit compression module 322 is a separate entity of the improved decoder 320, which performs the same functions as the improved 12-bit compression module 312. Other embodiments of the improved decoder 320 may share the improved 12-bit compression module 312 with the improved IBDI encoder 310. Similarly, the improved decoder 320 may have a separate entity of an improved 12-bit decompression module 324 or share the improved 12-bit decompression module 314 with the improved IBDI encoder 310. The pixels of 12-bit depth of the decompressed video are converted to pixels of 8-bit depth by a rounding module 222. To simplify one embodiment of the description of the invention, only the improved 12-bit compression module 312 and improved 12-bit decompression module 314 of the improved IBDI encoder 310 are described below.

Figure 4:
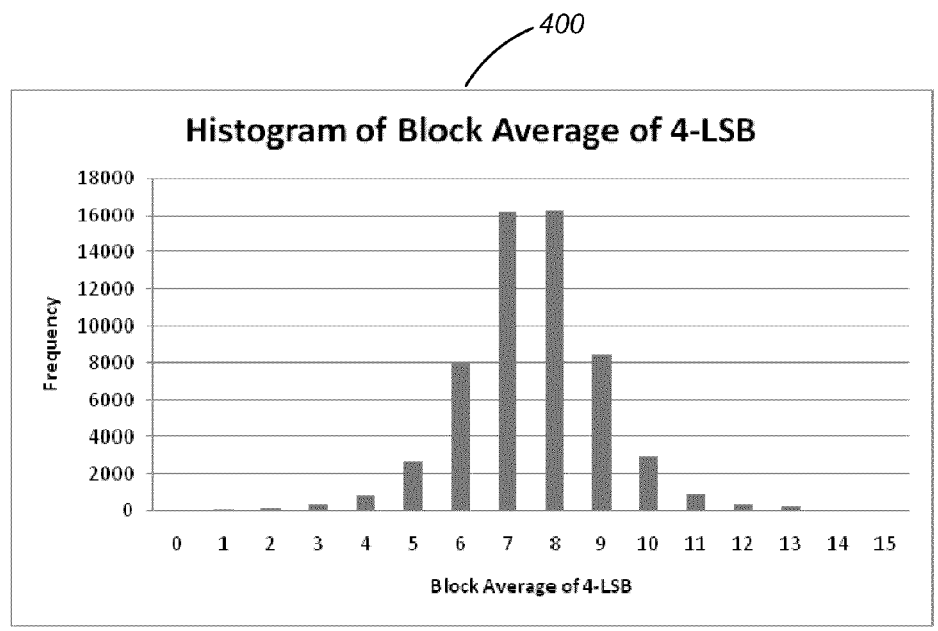
FIG. 4 illustrates a histogram of 4 least significant bit (LSB) of frame buffer pixels according to one embodiment.

FIG. 4 shows a histogram 400 of block average of 4-LSB of the pixels at the input to the improved 12-bit compression module 312 for an example input video. FIG. 4 illustrates that there is some variability at the block level that the improved 12-bit compression module 312 can exploit to improve its coding efficiency. In one embodiment, the improved 12-bit compression module 312 computes an adaptive offset per block (e.g., of size of 4×4) that is stored in the DPB and used by the improved 12-bit decompression module 314 to be added to the de-quantized pixels values in the reference frames compression (RFC) process. The improved 12-bit compression module 312 can compute the best adaptive offset per block given its knowledge of the fractional LSB of the 12-bit pixel values. It can be proved that the optimal value (in terms of least-square-error) for an adaptive offset to be added is the average of the fractional LSB values. The adaptive offset can be stored in the unused bits for the adaptive-scaling mode shown in Table 3, for example. The improved 12-bit compression module 312 applies the adaptive offset when the flag for fixed-scaling is not set (i.e., the flag value is zero). The following Table 4 contains the pseudo code for the improved 12-bit compression module 312 described above:

TABLE 4

Adaptive Offset for RFC Compression

M = (minimum pixel value in block) & ~((1<<4) − 1)   /* keep only 8-MSB of minimum */
R = (maximum pixel value in block) − M
for (S=0; R>=(128<<S) && S<4; S ++);
if (S = 4) {
  flag = 1
  P[i] = min(255, pixel_value[i] + 8) >> 4, for all i TABLE 4-continued Adaptive Offset for RFC Compression

```
  offset = 0;
} else {
  flag = 0
  P[i] = (pixel_value[i] − M) >> S, for all i
  offset = ( sum( pixel_value[i] & ((1 << S) − 1) ) + 7 ) >> 4
}
```

Variable M is the minimum pixel value within a block (e.g., a 4×4 block) computed with 8 leading bits of precision. Variable R represents the difference between the maximum pixel value within the block and M. S represents the amount of scaling applied to each pixel. P[i] is the scaled residual pixel value at i-th pixel in the block.

The following Table 5 contains an example compression format of the above embodiment using adaptive offset:

TABLE 5

Example Compression Storage Format for Adaptive Offset

```
flag = u(1);                    /* Fixed or adaptive scaling */
if (flag) {
  /* Fixed scaling: 128-bit    */
  for (i=0; i<16; i++) u(8)     /* pixel value P[i]*/
} else {
  /* Adaptive scaling with adaptive offset: 126-bit */
  u(2);                         /* S: [0..3] */
  u(8);                         /* M >> 4: [0..255] */
  u(4);                         /* offset: [0..15] */
  for (i=0; i<16; i++) u(7)     /* pixel value P[i]*/
}
```

In one example embodiment, the improved 12-bit decompression module 314 decompresses a compressed pixel using the following pseudo code:

```
if (flag)
  D[i] = (P[i] << 4)
else
  D[i] = (P[i] << S) + M + offset
``` where D[i] is the pixel value of a decompressed pixel at i-th position in the block. The experimental results of the embodiment illustrated above shows decreased efficiency loss compared with an existing IBDI codec.

In another embodiment, the improved 12-bit compression module 312 uses a unified scaling scheme for compression. Comparing with the embodiment illustrated in Table 5, the embodiment illustrated in Table 6 eliminates fixed scaling, allows the scaling variable to vary from 0 to 5 (inclusive) and modifies the computation such that the improved 12-bit compression module 312 can compute and store the minimum pixel value in the block (i.e., variable M) using (12-S) bits and the offset with S bits. Therefore, both the minimum pixel value and the offset values can be stored using 12 bits.

TABLE 6

Unified Scaling Embodiment of the Improved
12-bit Compression Module 312

```
M = (minimum pixel value in block)
R = (maximum pixel value in block) − M
for (S=0; (R>>S)−(M>>S)>=128; S++);
mask = (1 << S) − 1
offset = ( sum( pixel_value[i] & mask ) + 7) >> 4
```

TABLE 6-continued

Unified Scaling Embodiment of the Improved
12-bit Compression Module 312

```
M = M & ~mask
P[i] = (pixel_value[i] − M) >> S, for all i
```

In one example embodiment, the improved 12-bit decompression module 314 decompresses a compressed pixel using the following pseudo code:

```
D[i] = (P[i] << S) + M + offset, for all i
``` where D[i] is the pixel value of a decompressed pixel at i-th position in the block. The experimental results of the embodiment illustrated above show increased coding efficiency compared with an existing IBDI codec.

An example of storing the minimum pixel value and the offset values in 12 bits using the unified scaling scheme is illustrated in Table 7 below. The total number of bits used for a 4×4 block is 127.

TABLE 7

Storage Format for Unified Scaling

```
u(3);                         /* S: [0..5] */
u(12-S);                      /* M */
u(S);                         /* offset */
for (1=0; i<16; i++) u(7);    /* P[i] */
```

The improved 12-bit compression module 312 can further reduce the number of bits in the compression format by noting that at least one of the compressed pixel (P variable) values is 0, which corresponds to the entry with the minimum pixel value. The improved 12-bit compression module 312 can signal the location of the minimum pixel value and only code the other 15 P values. The location can be coded using 4 bits, thus reducing the compression format to 124 bits. This is an implementation optimization that does not affect coding distortion. The extra 4 bits allows the improved 12-bit compression module 312 to consider further enhancements to the algorithm that can be made to use the extra 4 bits for side information.

Table 8 shows an example optimized compression format for the unified scaling method:

TABLE 8

Optimized Compression Format for Unified Scaling

```
u(6-S);                       /* S: code (5-S) in unary */
u(12-S);                      /* M */
u(S);                         /* Offset */
u(4);                         /* M_index */
for (i=0; i<15; i++) u(7);    /* P array excluding P[M_index]*/
```

Shown in Table 8, the total number of bits used is (127-S). There are (S+1) bits left over, given a 128-bit budget. This is enough to code a second offset value. In one embodiment, the offset is computed for each block of 4×4 pixels. In another embodiment ("advanced unified scaling"), the improved 12-bit compression module 312 computes two offsets, one for each 4×2 sub-block. An alternative embodiment may use 2×4 sub-blocks. This can potentially reduce the distortion by better adapting the offsets to the local statistics. An example compression format for advanced unified scaling using a total 127 bits is shown below in Table 9. The compression and decompression algorithms are the same as with the unified scaling described above except that two offsets are computed for 4×2 sub-blocks.

TABLE 9

Compression Format for Advanced Unified Scaling

| | |
|---|---|
| u(6-S); | /* S: code (5-S) in unary */ |
| u(12-S); | /* M */ |
| u(S); | /* offset 1*/ |
| u(S); | /* offset 2 */ |
| u(4); | /* M_index */ |
| for (i=0; i<15; i++) u(7); | /* P array excluding P[M_index]*/ |

Unified Scaling with DPCM Coding

The unified scaling scheme illustrated in Table 6 can be further improved with efficient coding of residual pixel values (i.e., P[i] values). In one embodiment, the improved 12-bit compression module 312 computes the residual pixel values P as the scaled difference between the original pixel value and the quantized minimum M: P[i]=(pixel_value[i]−M)>>S. The scale factor S is computed such that the residual pixel values P for the maximum pixel value R can be represented using 7 bits. For blocks where the residual changes gradually, the differences of the residual pixel values P between adjacent pixels can often be coded using fewer bits for a given scale factor using differential pulse-code modulation (DPCM). A smaller scale factor S can potentially be used with DPCM coding.

Figure 5A:
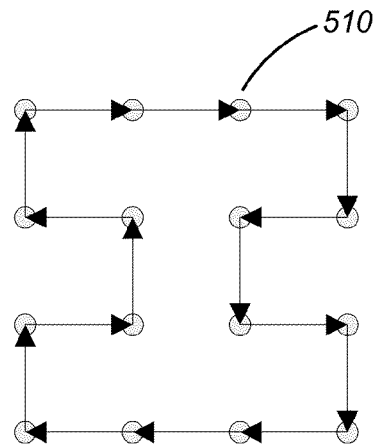
FIG. 5A illustrates a first example of a cyclic scanning pattern of residual pixels.
Figure 5B:
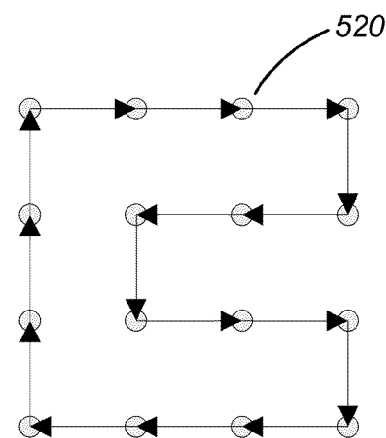
FIG. 5B illustrates a second example of a cyclic scanning pattern of residual pixels.
Figure 5C:
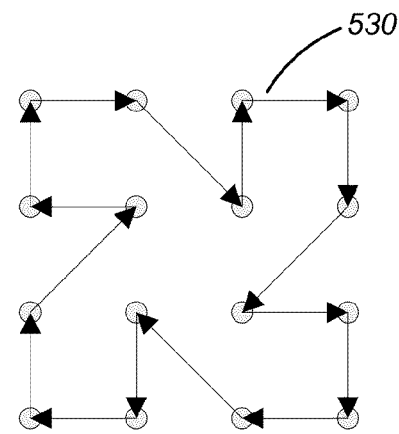
FIG. 5C illustrates a third example of a cyclic scanning pattern of residual pixels.

In one embodiment, the DPCM coding of the residual pixel values comprises scanning the residual pixel values and delta coding the residual pixels by the compression module 312. For differential coding, the order in which the differences are computed needs to be considered. A scan pattern determines the order in which the differences are computed. Generally, a scan pattern should cover every sample location exactly once. Given that the index of the minimum sample is coded in the optimized compression format given in Table 8, the improved 12-bit compression module 312 starts the scanning at the location of the minimum sample. Given that the minimum sample can occur at any location, the scanning pattern is cyclic. In a traditional scan pattern such as the zig-zag scan for a 4×4 block of pixels, the pattern begins at the upper-left sample (0,0) and ends at the lower-right sample (3,3). Making the zig-zag scan into a cyclic scan may introduce a jump between (3,3) and (0,0). A better scanning pattern has the property that successive positions in the scan map to adjacent spatial positions. FIG. 5A-5C are three examples 510, 520 and 530 of cyclic scan that have this property of a 4×4 block of pixels. Alternative embodiments may consider rotations and flips of these basic patterns illustrated in FIG. 5A-5C. Other embodiments may use many other cyclic scan patterns.

With unified scaling illustrated in Table 6, the improved 12-bit compression module 312 codes the residual pixel value P using unsigned 7-bit integers because the residual is computed against the minimum sample. With DPCM coding, the delta values need to be represented as signed 7-bit integers. If using twos-complement representation, a 7-bit integer can represent the integers between −64 and 63, inclusive. However, if the previous sample is the minimum sample, for instance, then using twos-complement is inefficient because half of the range is not being used.

In one embodiment, the improved 12-bit compression module 312 uses excess-N representation, where N is adapted per coded sample to maximize the range of representable differences. The same technique can be applied when the previous sample is near the maximum sample. Since the unified scaling scheme does not signal the maximum sample value, the improved 12-bit compression module 312 needs to signal the maximum sample value to increase the range of representable differences when the previous sample is near the maximum value. Due to a limited bit budget, instead of coding the maximum, the improved 12-bit compression module 312 codes the difference between the maximum and minimum, which can be used as the range of representable differences. The range can be further quantized to reduce the number of bits needed to code it.

The following is an example pseudo code of delta coding of residual pixel values with an adaptive excess-N representation.

```
Assumption: S, coded_min, and range have been computed.
coded_max = coded_min + range
Loop over 15 samples in scan order starting with sample that
follows the min sample in scan order:
    cur_pel = (sample at current scan position) >> S
    min_delta = −64
    if (coded_min − prev_pel > −64) {
        min_delta = coded_min − prev_pel
    } else if (coded_max − prev_pel < 63) {
        min_delta = coded_max − prev_pel − 127
    }
    delta = (cur_pel − prev_pel − min_delta)
```

An example compression format for N-to-8 compression using unified scaling with DPCM coding is shown below in Table 10, where N is the internal bit-depth and can range from 9 to 14, inclusive.

TABLE 10

Compression Format for Unified Scaling with DPCM Coding

| | |
|---|---|
| u(k); | /* dpcm_flag_range */ |
| u( ceil(log2(N-6)) ); | /* S */ |
| u(N-S); | /* M */ |
| u(S); | /* offset */ |
| u(4); | /* M_index */ |
| for (i=0; i<15; i++) u(7); | /* P array excluding P[M_index]*/ |

Using unified scaling with DPCM coding, the improved 12-bit compression module 312 needs to determine both the scaling factor S and whether to use DPCM. It is possible to use a higher S when DPCM coding is used for the residual. Therefore, the improved 12-bit compression module 312 needs to signal per block when to use DPCM mode. Since the range is only needed in DPCM mode, in one embodiment, the improved 12-bit compression module 312 combines the coding of DPCM flag and range into one codeword.

From Table 10, the improved 12-bit compression module 312 can compute the number of bits used to code each block as follows:

$$\text{bits}(N) = k + \lceil \log_2(N-6) \rceil + N + 109,$$

where the values of k for each value of N, given a budget of 128 bits, are tabulated below in Table 11.

TABLE 11

Number of Bits to Code S and dpcm_flag_range

| N | bits for S | k = bits for dpcm_flag_range |
|---|---|---|
| 9 | 2 | 8 |
| 10 | 2 | 7 |
| 11 | 3 | 5 |
| 12 | 3 | 4 |
| 13 | 3 | 3 |
| 14 | 3 | 2 |

The improved 12-bit compression module 312 codes the k most significant bits of range and reserves one codeword to signal dpcm_flag=0. In a preferred embodiment, the improved 12-bit compression module 312 reserves the codeword 0 to signal dpcm_flag=0. Any other codeword signals dpcm_flag=1.

In one embodiment, the improved 12-bit compression module 312 first computes S for the non-DPCM case as illustrated in Table 6. The improved 12-bit compression module 312 then determines whether to use a smaller value of S with DPCM coding. Table 12 below illustrates a pseudo code of an embodiment of unified scaling with DPCM compression and Table 13 is the corresponding pseudo code of an embodiment of unified scaling with DPCM decompression. Parameter k represents number of bits needed to code dpcm_flag_range defined in Table 11.

TABLE 12

Pseudo Code for Unified Scaling with DPCM Compression

```
M = (minimum pixel value in block)
M_index = least position of minimum pixel value
R = (maximum pixel value in block)
for (S=0; (R>>S)−(M>>S)>=128; S++);
valid = 0
for (Sd=0; Sd<S && !valid; Sd += !valid) {
    coded_min = M >> Sd
    dpcm_flag_range = max(1, (R-M) >> (N − k))
    coded_max = coded_min + (((dpcm_flag_range +
    1) << (N − k)) >> Sd) − 1
    start scan at position after M_index
    for (i=0; i<15; i++) {
        cur_pel = (sample at current scan position) >> Sd
        prev_pel = (sample at previous scan position) >> Sd
        min_delta = −64
        if (coded_min − prev_pel > −64) {
            min_delta = coded_min − prev_pel
        } else if (coded_max − prev_pel < 63) {
            min_delta = coded_max − prev_pel − 127
        }
        P[i] = (cur_pel − prev_pel − min_delta)
        go to next scan position
    }
    if (0 ≤ P[i] < 128, for all i)
        valid = 1
}
if (Sd < S) then
    S = Sd
else
    dpcm_flag_range = 0
mask = (1 << S) − 1
offset = ( sum( pixel value[i]& mask ) + 7 ) >> 4
M = M & ~mask
if (dpcm_flag_range == (0)
    P[i] = (pixel_value[i] − M) >> S, for all i
```

TABLE 13

Pseudo Code for Unified Scaling with DPCM Decompression

```
if (dpcm_flag_range == (0) then {
    P[M_index] = 0
    D[i] = (P[i] << S) + M + offset, for all i
} else {
    coded_min = M >> S
    coded_max = coded_min + (((dpcm_flag_range+1) <<
    (N − k)) >> S) − 1
    D[M_index] = M + offset
    start scan at position after M_index
    for (i=0; i<15; i++) {
        prev_pel = (D[previous scan position]) >> S
        min_delta = −64
        if (coded_min − prev_pel > −64) {
            min_delta = coded_min − prev_pel
        } else if (coded_max − prev_pel < 63) {
            min_delta = coded_max − prev_pel − 127
        }
        D[current scan position] = ((P[i] + min_delta +
        prev_pel) << S) + offset
        go to next scan position
    }
}
```

Figure 6:
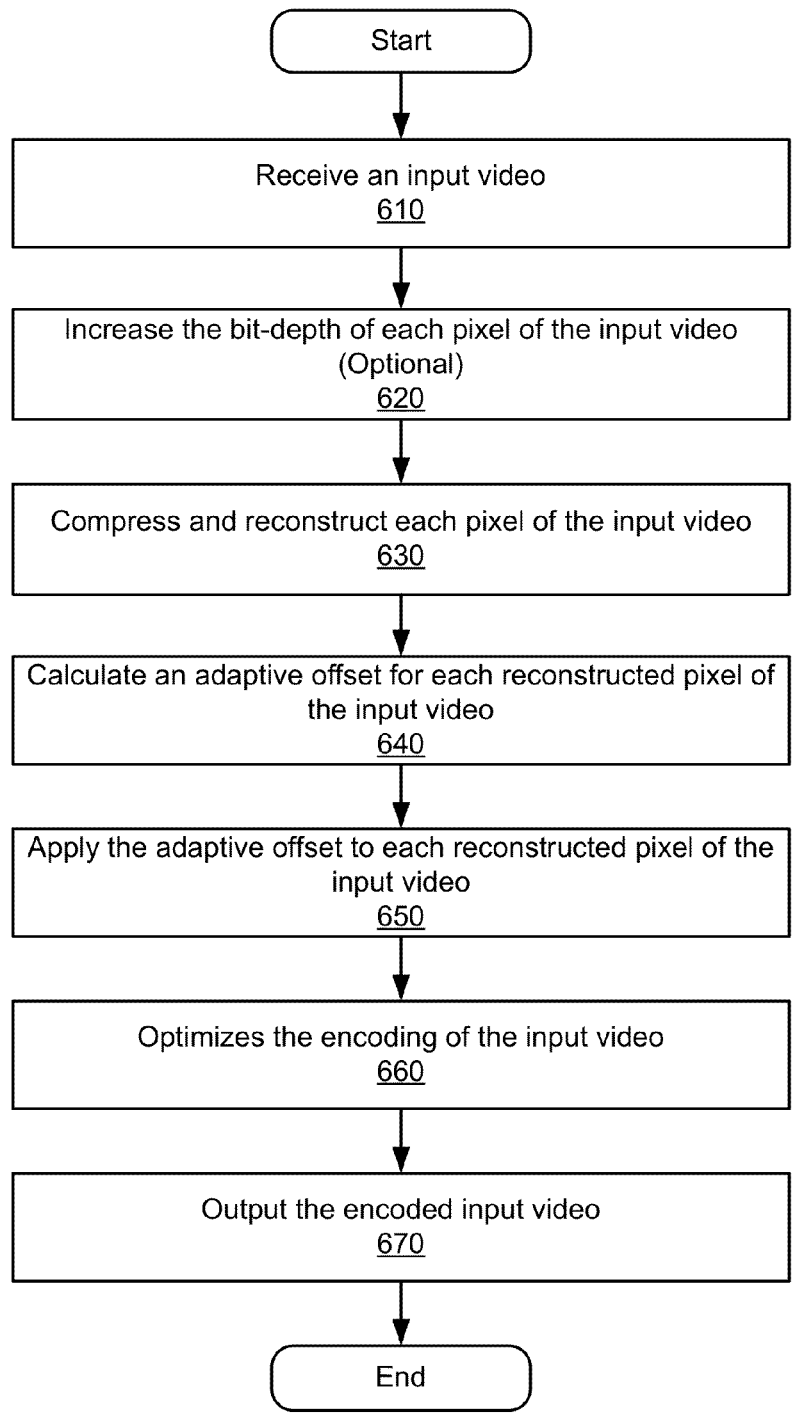
FIG. 6 is a flow chart of encoding an input video sequence using improved IBDI encoding.

FIG. 6 is a flow chart of encoding an input video sequence using improved IBDI encoding. Initially, the improved IBDI encoder 310 receives 610 an input video of multiple video frames, each of which has multiple pixels. Each pixel of the input video has an n-bit depth (e.g., 8-bit depth). The improved IBDI encoder 310 optionally increases 620 the bit-depth of each pixel by a predetermined factor, (e.g., increasing the 8-bit depth by a factor of 4). In another embodiment, the bit-depth of each pixel (e.g., 12-bit pixel) of the input video is not increased. Each pixel with the increased bit depth or with original bit depth is compressed and reconstucted 630. The improved IBDI encoder 310 calculates 640 an adaptive offset for each reconstructed pixel of the input video, and applies 650 the calculated adaptive offset to each reconstructed pixel of the input video to generate an encoded input video. The improved IBDI encoder 310 optimizes 660 the encoding of the input video and outputs 670 the encoded input video to other video processing modules, e.g., the improved IBDI decoder 320, for further processing.

There are various embodiments to calculate the adaptive offset for each de-quantized pixel of the input video. In one embodiment, the improved IBDI encoder 310 constrains the adaptive offset value to a predetermined range of values and calculates the adaptive offset based on two sub-offset values, each of which is determined using partial bits of the total bits available for encoding the pixels of the input video.

In another embodiment, the improved IBDI encoder 310 optimizes the IBDI encoding using the unified scaling method illustrated in Table 8. The improved IBDI encoder 310 computes residual pixel value for each pixel of the input video, where the residual pixel value is the difference between the original pixel value and a quantized minimum pixel value. The improved IBDI encoder 310 further scales the residual pixel value of each pixel of the input video based on a scaling factor such that the differences of the scaled residual pixel values are within a range of representable differences.

The disclosed embodiments beneficially allow for a system and methods for improving coding efficiency of compression with internal bit depth increase. Using adaptive offsets and unified scaling potentially reduces encoding distortion by better adapting scaling offsets to local statistics. Using DPCM coding with the unified scaling further improves the coding efficiency of compression with IBDI.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described in FIG. 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods, e.g., described with FIG. 6, may be performed, at least partially, by one or more processors, e.g., 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving coding efficiency of compression with internal bit depth increase through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for improving coding efficiency of compression of an input video with internal bit depth increase (IBDI), the method comprising:
   receiving the input video comprising a plurality of video frames, each video frame comprising a plurality of pixels, each pixel having a n-bit depth;
   increasing the n-bit depth of each pixel by a predetermined factor;
   compressing each pixel of the input video and reconstructing each compressed pixel of the input video;
   calculating an adaptive offset for the value of each reconstructed pixel of the input video based on two sub-offset values, each of the sub-offset values determined using partial bits of total bits available for encoding the pixels; and
   applying the adaptive offset to each reconstructed pixel values of the input video.

2. The method of claim 1, wherein calculating the adaptive offset further comprises computing a fractional offset based on the fractional least significant bits of the pixel values, wherein the adaptive offset is set to the computed fractional offset.

3. The method of claim 1, wherein calculating the adaptive offset further comprises constraining the adaptive offset value to a predetermined range of values.

4. The method of claim 1, wherein each pixel of the input video is of 8-bit depth.

5. The method of claim 1, wherein the predetermined factor is 4-bit depth.

6. The method of claim 1, further comprising computing a residual pixel value for each pixel of the input video, wherein the residual pixel value is the difference between the original pixel value and a quantized minimum pixel value.

7. The method of claim 6, further comprising scaling the residual pixel value based on a scaling factor.

8. The method claim 6, further comprising computing a range of representable differences for the residual pixel values.

9. The method of claim 8, wherein the range of representable differences is represented by an excess-N representation, wherein N is determined to maximize the range of representable differences.

10. A non-transitory computer-readable storage medium storing executable computer program instructions for improving coding efficiency of compression of an input video with internal bit depth increase, the computer program instructions comprising:
    computer program code for receiving the input video comprising a plurality of video frames, each video frame comprising a plurality of pixels, each pixel having a n-bit depth;
    computer program code for increasing the n-bit depth of each pixel by a predetermined factor;
    computer program code for compressing each pixel of the input video and reconstructing each compressed pixel of the input video;
    computer program code for calculating an adaptive offset for the value of each reconstructed pixel of the input video based on two sub-offset values, each of the sub-offset values determined using partial bits of total bits available for encoding the pixels; and
    computer program code for applying the adaptive offset to each reconstructed pixel values of the input video.

11. The computer-readable storage medium of claim 10, wherein the computer program code for calculating the adaptive offset further comprises computer program code for computing a fractional offset based on the fractional least significant bits of the pixel values, wherein the adaptive offset is set to the computed fractional offset.

12. The computer-readable storage medium of claim 10, wherein the computer program code for calculating the adaptive offset further comprises computer program code for constraining the adaptive offset value to a predetermined range of values.

13. The computer-readable storage medium of claim 10, further comprising computer program code for computing a residual pixel value for each pixel of the input video, wherein the residual pixel value is the difference between the original pixel value and a quantized minimum pixel value.

14. A computer system for improving coding efficiency of compression of a video with internal bit depth increase, the system comprising:
- a non-transitory computer-readable storage medium storing executable computer program instructions for, the computer program instructions comprising:
    - computer program code for receiving the input video comprising a plurality of video frames, each video frame comprising a plurality of pixels, each pixel having a n-bit depth;
    - computer program code for increasing the n-bit depth of each pixel by a predetermined factor;
    - computer program code for compressing each pixel of the input video and reconstructing each compressed pixel of the input video;
    - computer program code for calculating an adaptive offset for the value of each reconstructed pixel of the input video based on two sub-offset values, each of the sub-offset values determined using partial bits of total bits available for encoding the pixels; and
    - computer program code for applying the adaptive offset to each reconstructed pixel values of the input video.

15. The computer system of claim 14, wherein the computer program code for calculating the adaptive offset further comprises computer program code for computing a fractional offset based on the fractional least significant bits of the pixel values, wherein the adaptive offset is set to the computed fractional offset.

16. The computer system of claim 14, wherein the computer program code for calculating the adaptive offset further comprises computer program code for constraining the adaptive offset value to a predetermined range of values.

\* \* \* \* \*